Oct. 14, 1958
R. PETERS
2,856,090
HAND TRUCKS
Filed Dec. 20, 1955
2 Sheets-Sheet 1
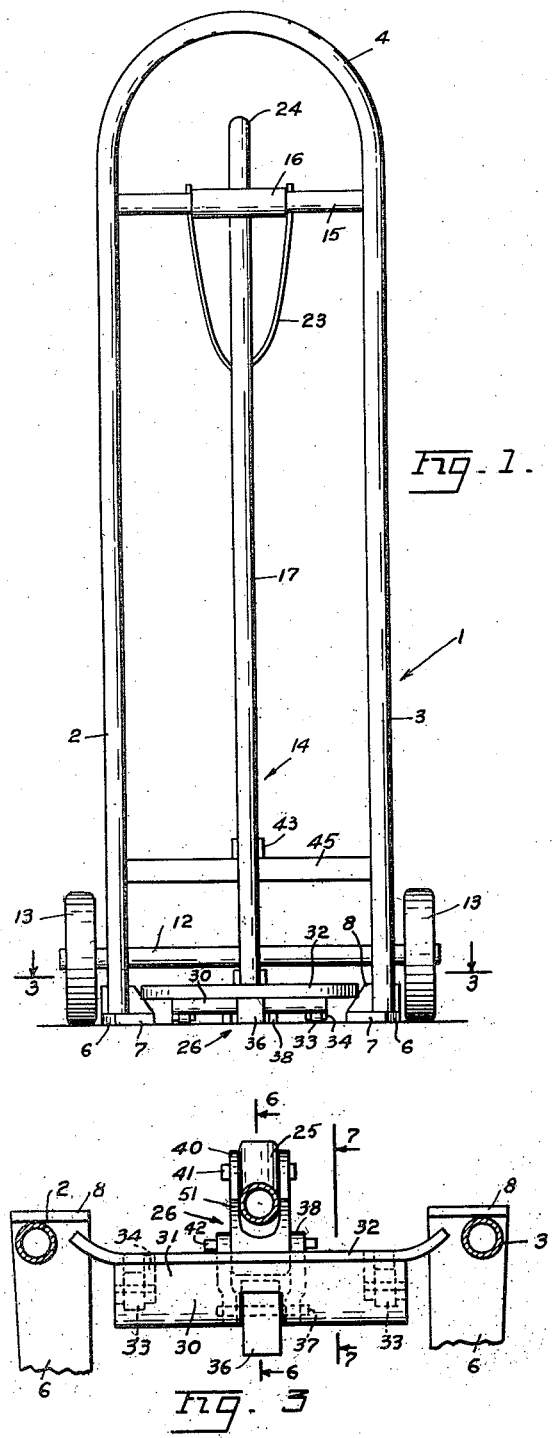
Fig. 1.
Fig. 3.
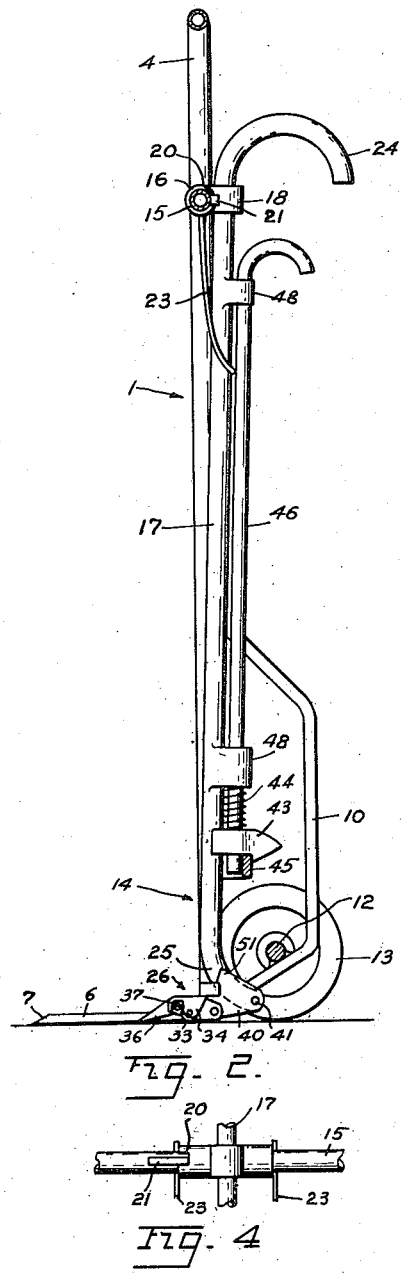
Fig. 2.
Fig. 4.
INVENTOR.
RUDOLPH PETERS
BY White & Riaboff
ATTORNEYS Oct. 14, 1958     R. PETERS     2,856,090
HAND TRUCKS
Filed Dec. 20, 1955     2 Sheets-Sheet 2
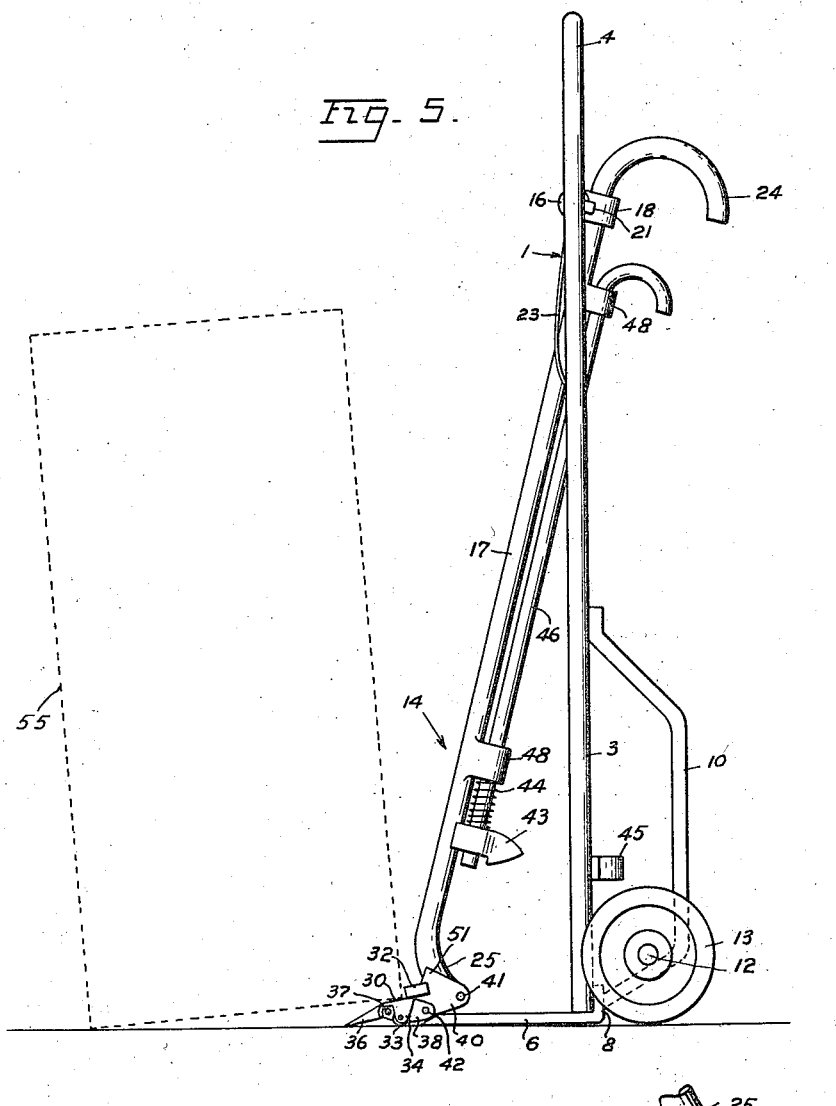
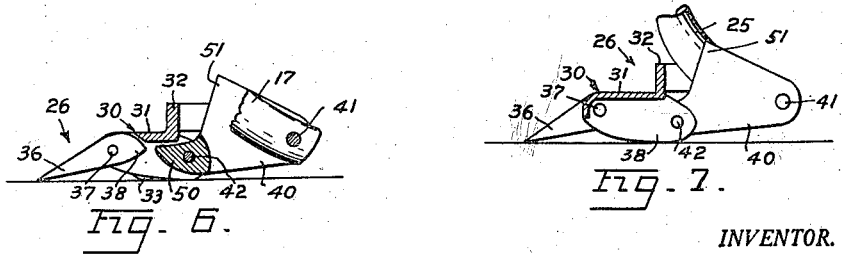
INVENTOR.
RUDOLPH PETERS
BY White & Raboff
ATTORNEYS United States Patent Office 2,856,090
Patented Oct. 14, 1958

2,856,090
HAND TRUCKS
Rudolph Peters, Oakland, Calif.
Application December 20, 1955, Serial No. 554,221
5 Claims. (Cl. 214—353)

This invention relates to an improvement in a hand truck used in trucking crates, cartons, or the like.

The object of this invention is to provide a hand truck with a means of assisting the loading and unloading of the same.

Another object of this invention is to provide a hand truck with a mechanism for loading and unloading a stack of boxes or the like on or off the truck, said mechanism including a movable platform which supports one side of the stack in spaced relation to the ground while the load bearing plates are inserted under said stack for loading the truck or withdrawn from thereunder for unloading the truck.

Other objects and advantages will appear as the specification proceeds and the novel features of the device will be particularly pointed out in the claims hereto annexed.

In this specification and the annexed drawing, the invention is illustrated in the form considered to be the best but it is understood, that the invention is not limited to such form; and it is also to be understood that in and by the claims following the description, it is desired to cover the invention in whatsoever form it may be embodied.

This invention is illustrated in the accompanying drawings forming a part of the specification in which:

Fig. 1 is a front elevation of the hand truck.

Fig. 2 is a side elevation of Fig. 1.

Fig. 3 is a plan view of said hand truck taken along the line of 3—3 of Fig. 1.

Fig. 4 shows a stop mechanism limiting the forward swing of the lever.

Fig. 5 shows the hand truck in a loading or unloading position, with the load supporting mechanism in an advanced position.

Fig. 6 is a central vertical section taken along the line 6—6 of Fig. 3, and

Fig. 7 is a vertical section taken along the line 7—7 of Fig. 3.

A hand truck comprising the subject matter of this invention consists of an inverted U-shaped frame 1 having two legs 2 and 3 and a half-circular top portion 4 connecting the latter. The frame 1 may be made of any material, but preferably of light steel tubing. A narrow plate 6 is secured by welding to each of the legs 2 and 3, which plates carry the load when the truck is moved from place to place. The ends of the plates 6 are beveled as shown at 7 to facilitate the insertion of the same under a load.

Each of the legs 2 and 3 is also provided with a bracket 10, the upper end of which is welded to said leg and the lower end to a rear end 8 of the plate 6. An axle 12 is welded to said brackets, thus giving the necessary rigidity to the legs 2 and 3 and the plates 6. The ends of the axle 12 project beyond said brackets 10 and carry freely rotating wheels 13.

The above described parts are more or less standard in hand trucks presently in general use.

The above hand truck is provided with a loading and unloading mechanism generally indicated at 14 and which is described as follows:

A cross-tube 15 is welded to the legs 2 and 3 near the half circular portion 4. The cross-tube 15 rotatably carries a sleeve 16 to which a lever 17 is secured by a collar 18 welded to said lever 17 and to said sleeve 16. The sleeve 16 has a notch 20 therein into which a stop 21 welded to the cross tube 15 is admitted. The stop 21 in cooperation with the notch 20 limits the rotation of the sleeve 16 about said cross-tube 15 and consequently the swinging of the lever 17 attached to said sleeve.

A U-shaped spring 23, the ends of which pass through the cross-tube 15, urge the lever 17 forwardly in relation to said frame 1 or said frame backwardly in relation to said lever. The upper end of said lever 17 is bent into a handle 24 for convenience of manipulation, and the lower end is bent backwardly as shown at 25 and carries a load supporting mechanism 26.

The latter mechanism is provided for the purpose of assisting the loading and unloading of boxes, crates and cartons on and off the hand truck. It consists of a narrow platform 30, located between the plates 6 and normally resting on the ground. The platform 30 has a substantially horizontal portion 31 and a flange 32 extending beyond said platform and over said plates 6. The platform 30 rests on two rollers 33 rotatably secured to brackets 34 provided on the under side of said platform.

A comparatively narrow wedge 36 is attached in the front end of said platform in the middle thereof by a pin 37 to a pair of vertical supports 38 extending from the front edge of said platform backwardly and downwardly so that their back portions normally rest on the ground, thus giving a firm support to the platform. The front end of said wedge 36 always rests on the ground, except when the truck is moved from place to place, but the downward movement of the front end of the wedge 36 is limited by a tail 38 of said wedge abutting said platform.

The platform 30 is connected to the lower end of the lever 17 by a connecting link 40. The latter is pivotally connected to the lever 17 by a pin 41 and to the platform 30 by a pin 42 passing through the vertical supports 38. The link 40 is provided with a tail end 50 projecting under the platform 30, whereby the downward swinging of said platform in relation to said link is limited by said tail end 50 and the upward swinging thereof is limited by the ears 51 of said link.

The height of the platform 30 is greater than the thickness of the plates 6. Therefore, when one end of a load rests on said platform as shown in Fig. 5, the plates 6 may easily be inserted under said load, or withdrawn therefrom.

The lever 17 is normally kept in its retracted position as shown in Fig. 2 by a catch 43 pressed downwardly by a spring 44, and retained by a crossbar 45 secured to the legs 2 and 3. The catch 43 is secured to the lower end of an operating bar 45 slidable in the collars 48 welded to the lever 17. When the bar 46 is pulled upwardly, the catch 43 releases the cross bar 45, and the spring 23 forces said lever to jump forward. However, the forward motion of the lever 17 is limited by the stop 21 in cooperation with the notch 20. Fig. 5 shows an advanced position of the lever 17 and secured thereto the load supporting mechanism 26. If the truck is tilted while being in this position, the ends of the flange 32 will rest on the ends of said plates, thus preventing said mechanism from falling therebetween.

The operation of the device is as follows:

Suppose an operator wishes to load a stack of boxes, or cartons, shown by dotted lines at 55 in Fig. 5. The operator forces the sharp ends 7 of the plate 6 under the bottom of the stack by pressing his foot against the axle 12, and if so desired, by slightly tilting the stack of boxes by one of his hands. When the sharp ends of the plates 6 are forced under said stack, the operator tilts the truck slightly toward himself, thus raising one end of the stack above the ground, and releases the lever 17 by pulling the bar 46 up and disengaging the catch 43 from the cross-bar 45. The spring 23 forces the lever 17 to swing in a clockwise direction looking at Fig. 5, thus bringing the load supporting mechanism 26 directly under the lifted end of the stack, as shown in Fig. 5. Thereafter, the operator tilts the truck away from himself and thereby permits one side of the stack to rest on the platform 30. The operator pushes the truck by his foot forwardly until the catch 43 is locked on the cross-bar 45. Then the operator tilts the truck toward himself, thus placing the load on the plates 6, and moves the truck with the stack on to a desired place. During the process of moving from one place to another, the load rests directly on the plates 6, as the load supporting mechanism 26 drops below said plates. Upon reaching the desired place, the operator tilts the truck to place the stack on the ground, whereby the free end of the stack is placed on the ground while the other end rests on the platform 30. The operator releases the catch 43 by pulling the bar 46 upwardly and the truck is pushed back by the action of the spring 23.

The lever 17 pulls the platform 30 away from the stack by the inertia of the truck movement. Said pull swings the connecting link 40 in counter-clockwise direction about the pin 42 whereby the ears 51 contact the flange 32 and force the platform 30 to tilt forwardly, thus facilitating the sliding of the stack off said platform.

I claim:

1. The combination of a hand truck including a frame having two legs, a pair of wheels rotatably secured to said frame, a plate secured to each leg for carrying a stack of boxes or the like with a mechanism for loading and unloading said truck, said mechanism consisting of means for supporting one side of a load above the plates while the same are moved under said load, or withdrawn from their position under the same, and means for moving said first mentioned means forward away from said truck and to said truck, said first mentioned means comprising a platform located between said plates, a wedge in front of said platform, and a link connecting said platform with the second mentioned means.

2. The combination of a hand truck including a frame having two legs, a pair of wheels rotatably secured to said frame, a plate secured to each leg for carrying a stack of boxes or the like with a mechanism for loading and unloading said truck, said mechanism consisting of means for supporting one side of a load above the plates while the same are moved under said load, or withdrawn from their position under the same, and means for moving said first mentioned means forward away from said truck and to said truck, said first mentioned means comprising a platform located between said plates, a wedge in front of said platform, and a link connecting said platform with the second mentioned means, said second mentioned means comprising a lever, a spring urging the lower end of said lever to swing forwardly, and a catch for holding said lever locked to the truck frame.

3. The combination of a hand truck including a frame having two legs, a pair of wheels rotatably secured to said frame, a plate secured to each leg for carrying a stack of boxes or the like with a mechanism for loading and unloading a stack of boxes or the like on or off the truck comprising means for holding one end of said stack in spaced relation to the ground to permit said plates to be inserted under said stack or be withdrawn from thereunder, and means for moving said first mentioned means in front of said plates and for retracting the same, comprising a lever secured to said frame, a spring urging said lever to swing forwardly away from said frame, a catch holding said lever locked to the frame, said first mentioned means including a platform for supporting one side of a load above said plates while said plates are inserted under the load, or withdrawn from thereunder, said platform normally resting on the ground, a wedge secured to the front of the platform and a link pivotally connecting said platform with the lower end of said lever.

4. The combination with a hand truck including a frame having two legs, a pair of wheels rotatably carried by said frame; a plate secured to each leg for carrying a stack of boxes, of a mechanism for loading and unloading said stack of boxes on or off said truck, means movable under one side of the stack to hold said side above the ground to permit the plates to be inserted under said stack, or be withdrawn therefrom, said means including a platform normally resting on the ground, and means for advancing the first mentioned means in front of said plates and for retracting the same toward the frame, said second mentioned means including a lever swingably secured to said frame, a spring urging said lever forwardly, a catch locking said lever to the frame; and means pivotally connecting the first mentioned means to the lower end of said lever.

5. A hand truck comprising a vertical frame including two legs, a pair of wheels rotatably carried by said frame, load carrying plates secured to the lower ends of said legs, a load supporting device arranged between said load carrying plates and resting on the ground during loading and unloading said truck; said device including a platform for supporting one side of a load when the same is loaded on, or unloaded from, said truck; said platform being of greater height than the thickness of said plates to provide a clearance between the ground and the side of the load supported by said device when the load is resting on said platform; a lever swingably secured to said frame; said device being pivotally connected to the lower end of said lever for advancing said device in front of said plates and wedging the same under one side of the load to raise the same above the ground for insertion of the plates thereunder, and for retracting said device toward the frame and holding the same in retracted position; said device providing support for one side of the load while unloading a load by withdrawing said plates from under the load; means for limting the forward movement of the device; and means for limiting the retracting motion of said device.

References Cited in the file of this patent

UNITED STATES PATENTS

| | | |
|---|---|---|
| 1,225,859 | Reed | May 15, 1917 |
| 1,636,574 | Perry | July 19, 1927 |
| 1,924,885 | Schreck | Aug. 29, 1933 |
| 2,570,726 | Smith | Oct. 9, 1951 |
| 2,765,090 | Halls | Oct. 2, 1956 |

FOREIGN PATENTS

| | | |
|---|---|---|
| 448,395 | Great Britain | June 8, 1936 |